(12) United States Patent
Blakeman (10) Patent No.: US 9,307,844 B2
(45) Date of Patent: Apr. 12, 2016

(54) SNAP-FIT JOINT FOR PLASTIC FRAME ELEMENTS AND FRAME FORMED THEREBY

(75) Inventor: Rex Blakeman, Jackson, MI (US)

(73) Assignee: APQ Development, LLC, Jackson, MI (US)

( * ) Notice: Subject to any disclaimer, the term of this patent is extended or adjusted under 35 U.S.C. 154(b) by 239 days.

(21) Appl. No.: 13/878,703

(22) PCT Filed: Oct. 20, 2011

(86) PCT No.: PCT/US2011/057151
§ 371 (c)(1),
(2), (4) Date: Aug. 30, 2013

(87) PCT Pub. No.: WO2012/054760
PCT Pub. Date: Apr. 26, 2012

(65) Prior Publication Data
US 2014/0023433 A1   Jan. 23, 2014

Related U.S. Application Data

(60) Provisional application No. 61/405,009, filed on Oct. 20, 2010.

(51) Int. Cl.
*G05G 1/12* (2006.01)
*A47C 31/00* (2006.01)
*F16B 12/26* (2006.01)

(52) U.S. Cl.
CPC ............... *A47C 31/00* (2013.01); *F16B 12/26* (2013.01); *Y10T 403/7039* (2015.01)

(58) Field of Classification Search
CPC .............. Y10T 403/602; Y10T 403/4641; Y10T 403/4642; Y10T 403/4648; Y10T 403/4654; Y10T 403/4657; Y10T 403/4661; Y10T 403/4662; Y10T 403/4665; Y10T 403/66; Y10T 403/70; Y10T 403/7094; Y10T 403/7039; A47C 31/00; F16B 12/26

USPC ......... 403/231, 244, 245, 247, 249–253, 341, 403/345, 361, 381, 382; 297/440.1, 440.13, 297/440.14, 440.16; 52/656.9, 589.1; 464/106, 108, 116, 124, 127
See application file for complete search history.

(56) References Cited

U.S. PATENT DOCUMENTS 2,568,071 A    9/1951  Johnson
3,544,161 A *  12/1970  Bryden ......................... 297/391

(Continued)

OTHER PUBLICATIONS

International Search Report for Application No. PCT/US2011/057151 dated Feb. 14, 2012.

*Primary Examiner* — Gregory Binda
*Assistant Examiner* — Nahid Amiri
(74) *Attorney, Agent, or Firm* — Honigman Miller Schwartz and Cohn LLP (57) ABSTRACT

A snap-fit joint for connecting frame members includes a male member having an insertion end, a top portion, and opposite sidewalls. A female member has a socket to receive the male member insertion end. The socket includes an upstanding wall that temporarily flexes outwardly. Co-acting surfaces of the upstanding socket wall and the male member sidewall include co-acting surfaces in temporarily contact during insertion of the male member into the female member socket to temporarily outwardly flex the upstanding socket wall and seat the male member. The socket wall terminates in a tab and the male member sidewall surface terminates in a recess. The male member is fully seated in the socket, and the co-acting surfaces are out of contact with each other, the upstanding socket wall returns to an unflexed condition, and the socket tab is received in sidewall to lock the male member within the socket.

9 Claims, 11 Drawing Sheets

(56) References Cited

U.S. PATENT DOCUMENTS

| | | | |
|---|---|---|---|
| 3,583,733 A | 6/1971 | Anderson | |
| 3,877,572 A | 4/1975 | Wiener, Jr. | |
| 4,099,887 A * | 7/1978 | Mackenroth | 403/4 |
| 4,691,965 A * | 9/1987 | Hsiung | 297/440.18 |
| 4,822,066 A * | 4/1989 | Rehrig | 280/79.11 |
| 4,850,477 A * | 7/1989 | Gelardi et al. | 206/765 |
| 5,011,224 A | 4/1991 | Paul | |
| 5,113,571 A * | 5/1992 | Manska | 29/453 |
| 5,249,839 A * | 10/1993 | Faiks et al. | 297/300.1 |
| 5,577,451 A * | 11/1996 | Yeh | 108/156 |
| 5,687,432 A | 11/1997 | Genzel | |
| 6,017,092 A * | 1/2000 | Lee | 297/440.15 |
| 6,059,368 A * | 5/2000 | Stumpf et al. | 297/440.11 |
| 6,141,926 A * | 11/2000 | Rossiter et al. | 52/239 |
| 8,282,307 B1 * | 10/2012 | Brown | 403/205 |
| 8,739,483 B1 * | 6/2014 | Bilge | 52/235 |
| 8,905,670 B1 * | 12/2014 | Blakeman | 403/381 |

\* cited by examiner

SNAP-FIT JOINT FOR PLASTIC FRAME ELEMENTS AND FRAME FORMED THEREBY

CROSS REFERENCE TO RELATED APPLICATIONS

This application claims the benefit of and priority to U.S. Provisional Application No. 61/405,009, filed Oct. 20, 2010, which is incorporated herein by reference.

BACKGROUND

The present disclosure relates generally to a snap-fit joint for a plastic frame element, as well as a frame formed with such a joint, and more particularly, to a joint having a male member and a corresponding female member, the female member being resiliently flexible for temporary deformation during insertion of the male member.

DESCRIPTION OF THE RELATED ART

Various types of joints are known for interconnecting two or more separate parts. With respect to plastic products, numerous snap-fit joints have heretofore been devised. These existing snap-fit joints, however, have several drawbacks. For example, these known snap-fit joints can be overly complex and thus manufacturing and constructing such joints can be inefficient, costly, and difficult.

Thus, there is a need for an improved snap-fit joint for a plastic frame element, as well as a better frame formed therefrom.

SUMMARY

Accordingly, the present disclosure relates to a snap-fit joint for connecting at least first and second plastic frame members. The snap-fit joint including a plastic male member having an insertion end, a top portion vertically spaced apart from the insertion end, and opposite sidewalls and a plastic female member having a socket to receive the male member, insertion end first, therein. The socket is substantially defined by opposite upstanding walls one of which can be temporarily flexed outwardly away from the socket. The socket defines an open end for receiving the insertion end of the male member.

Also provided is a plastic framework, such as a framework forming part of a chair. The plastic framework including front and rear rails and a pair of side-rails. Each of the front and rear rails and the pair of side-rails include one of a male member and a female member whereby the plastic front and rear rails of the plastic framework are securely mated to the side-rails of the plastic framework. Each male member includes an insertion end, a top portion vertically spaced apart from the insertion end, and opposite sidewalk. Each female member includes a socket to first receive the insertion end of the male member therein. The socket is substantially defined by opposite upstanding walls at least one of which can be temporarily flexed outwardly away from the socket. The socket defines an open end for receiving the insertion end of the male member.

Also provided is a snap-fit joint for connecting at least first and second plastic frame members. The snap-fit joint including a plastic male member having an insertion end, a top vertically spaced apart from the insertion end, and opposite sidewalls and a plastic female member having a socket to receive the male member, insertion end first, therein. The socket is substantially defined by opposite upstanding walls one of which can be temporarily flexed outwardly away from the socket. The socket defines an open end for receiving the insertion end of the male member. The upstanding walls of the socket and the opposite sidewalk of the male member include co-acting surfaces which temporarily contact each other during insertion of the male member into the socket of the female member to temporarily outwardly flex the upstanding wall of the socket until the male member is fully seated in the socket. The co-acting surfaces of the upstanding walls of the socket terminate in tabs and the co-acting surfaces of the sidewalk of the male member terminate in recesses. When the male member is fully seated in the socket, the co-acting surfaces are out of contact with each other, the upstanding wall of the socket returns to an unflexed condition, and the tabs of the upstanding walls of the socket are received in the recesses of the sidewalk of the male member to lock the male member within the socket.

An advantage of the present disclosure is that the snap-fit joint improves the manufacturability and construction of plastic frame elements while maintaining sufficient strength of the same.

Other features and advantages of the present disclosure will be readily appreciated, as the same becomes better understood after reading the subsequent description taken in conjunction with the accompanying drawings.

DESCRIPTION

Referring now to FIGS. 1-6b, a snap-fit joint for connecting first and second plastic frame elements, as well as a plastic framework incorporating one or more such snap-fit joints is illustrated, Like numerals refer to like or corresponding parts throughout the several views. In this example the snap-fit joint is utilized with a plastic framework 1 for a chair. It is contemplated, however, that the snap-fit joint may be employed in the interconnection of two or more frame elements in the construction of any of a variety of frameworks, wherein the snap-fit joint can be substituted for, or use in combination with, other conventional joints or joining means.

The snap-fit joint includes a plastic male member, indicated generally at 11, on a first frame element, which in this example is a front rail member 10. The snap fit joint also includes a plastic female member, indicated generally at 31, on a second frame element, which in this example is a side-rail member 30. As shown in the drawings, the joints can be provided on two or more frame elements, such as the front 10 and rear 10' rails and side rails 30, 30'.

Figure 3:
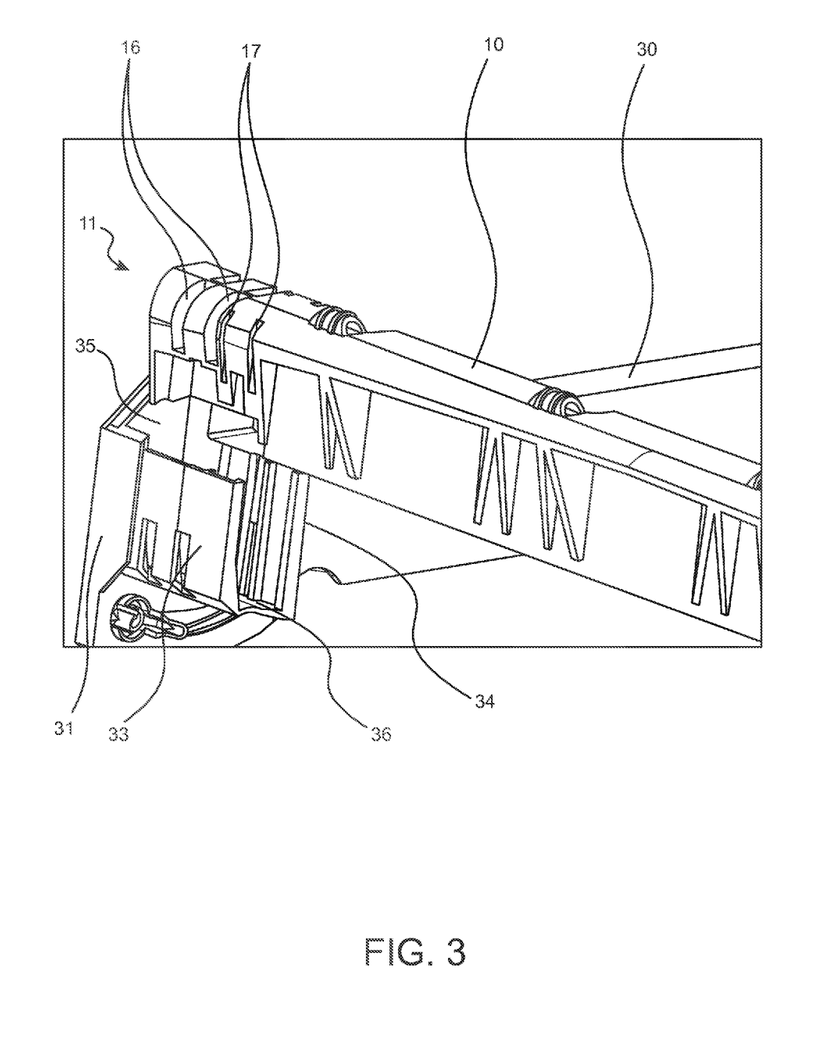
FIG. 3 is a perspective view of the disassembled frame elements of FIG. 2 taken from another viewing angle.
Figure 4:
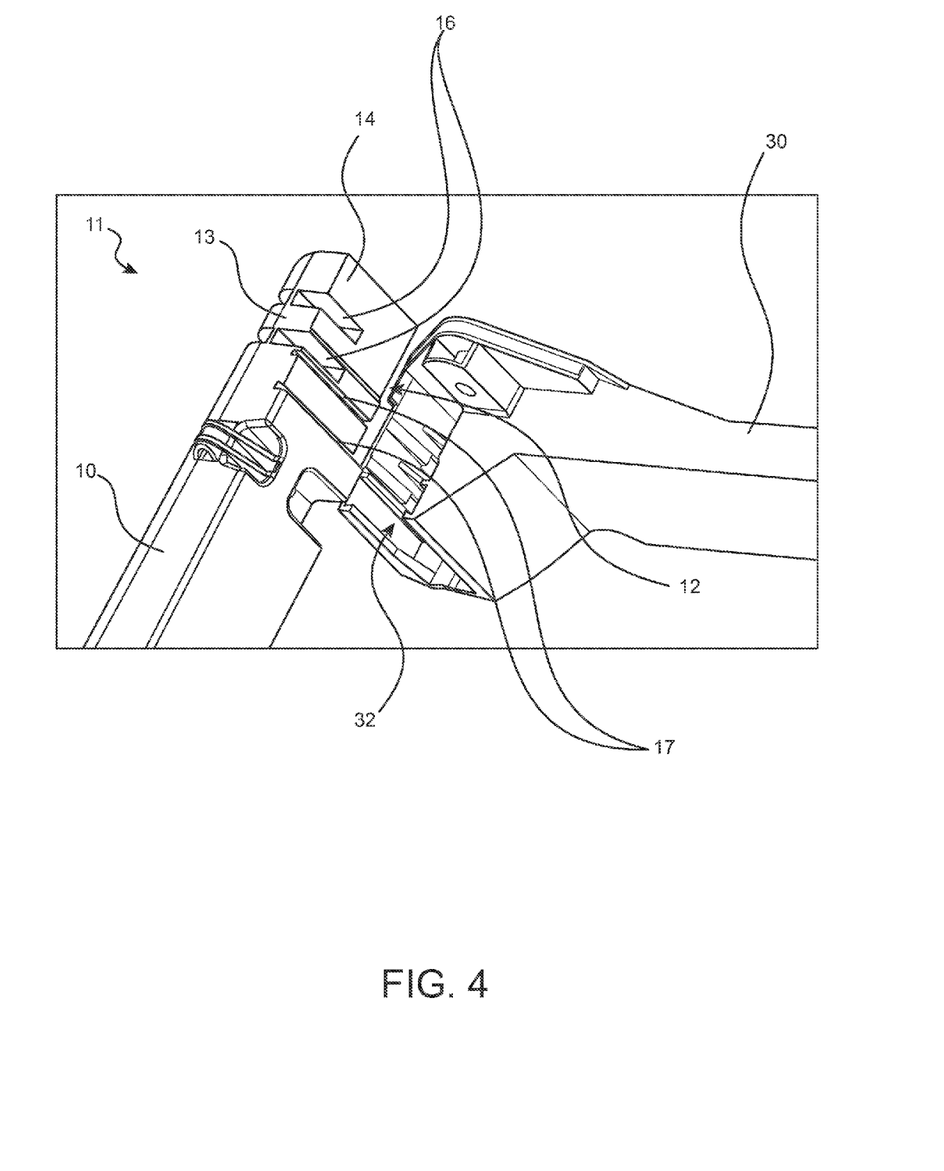
FIG. 4 is a perspective view of the disassembled frame elements of the framework of FIG. 1, depicting in particular the socket of the plastic female member and the corresponding male member.
Figure 5:
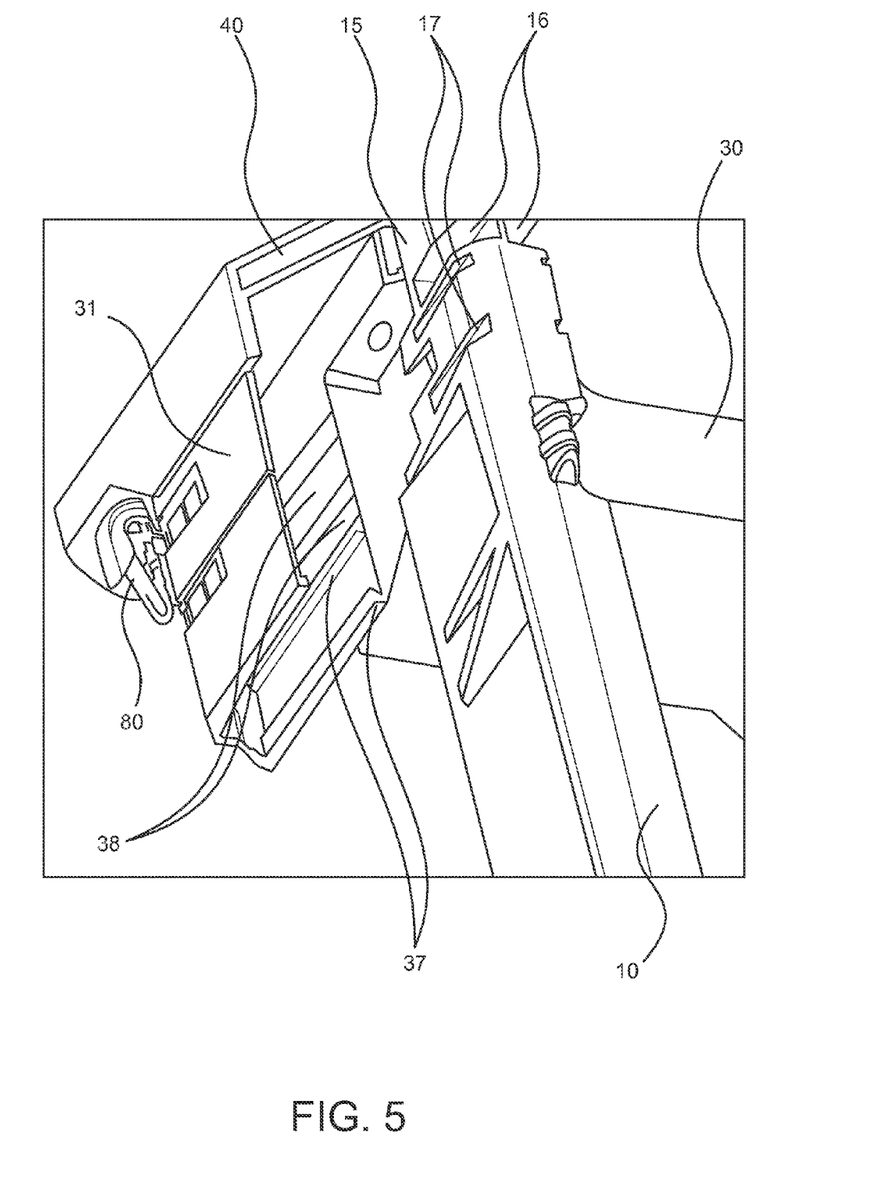
FIG. 5 is a perspective view of the disassembled frame element of FIG. 4 taken from another viewing angle.

Referring now to FIGS. 3 through 6b, the plastic male member 11 may include an irregularly-shaped element having an insertion end 12, a top portion 13 which is vertically spaced apart from the insertion end, and opposite sidewalls 14, 15. In cross-section, shown if FIG. 6, the male member 11 may define a generally trapezoidal shape, wherein the sidewalls 14, 15 are tapered so that the male member 11 is generally narrower in width proximate the insertion end 12. As shown in FIGS. 3 through 5, the sidewalls 14, 15 have a plurality of cut-outs which form recesses 16 and slots 17. Intermediate of the recesses 16 or slots 17, the sidewalls 14, 15 define variously shaped contact surfaces which contact corresponding surfaces of the female sockets 31 when the male member 11 is fully seated in the female socket 31.

Figure 6:
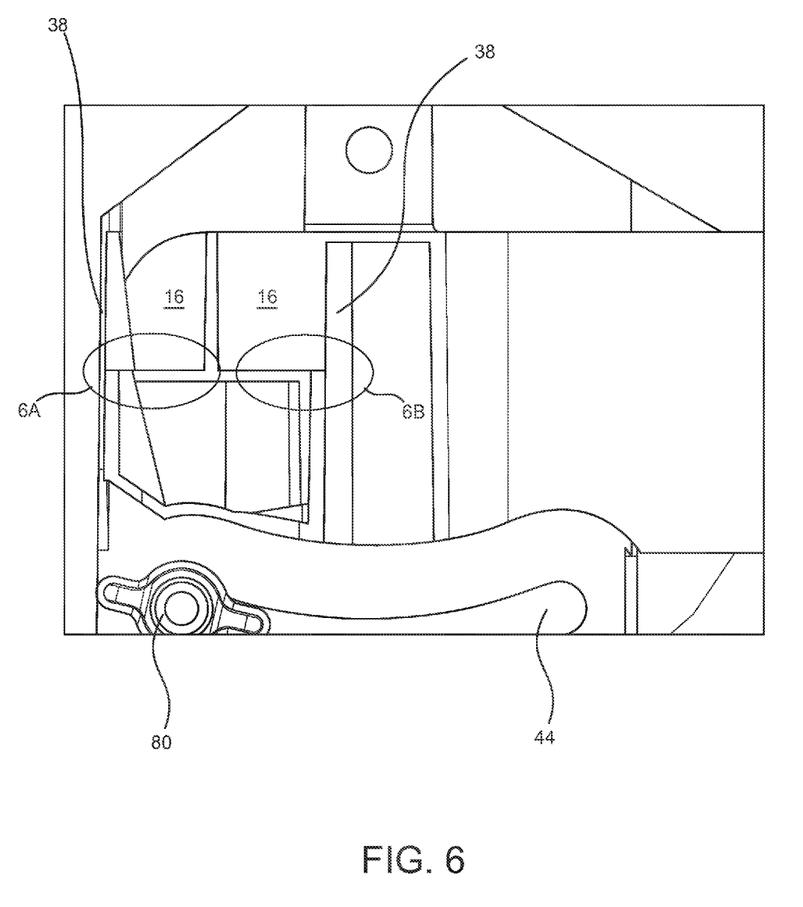
FIG. 6 is a cross-sectional view of the mated male and female members of the snap-fit joint taken along lines VI-VI of FIG. 7.
Figure 6A:
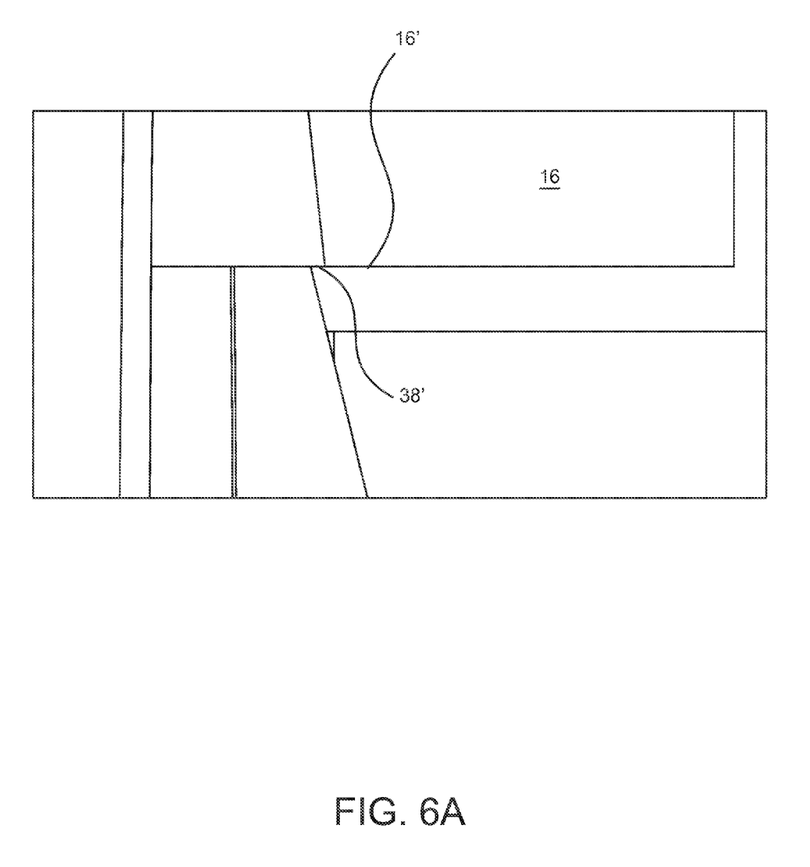
FIG. 6a is a cross-sectional view of the mated male and female members taken from FIG. 6.
Figure 6B:
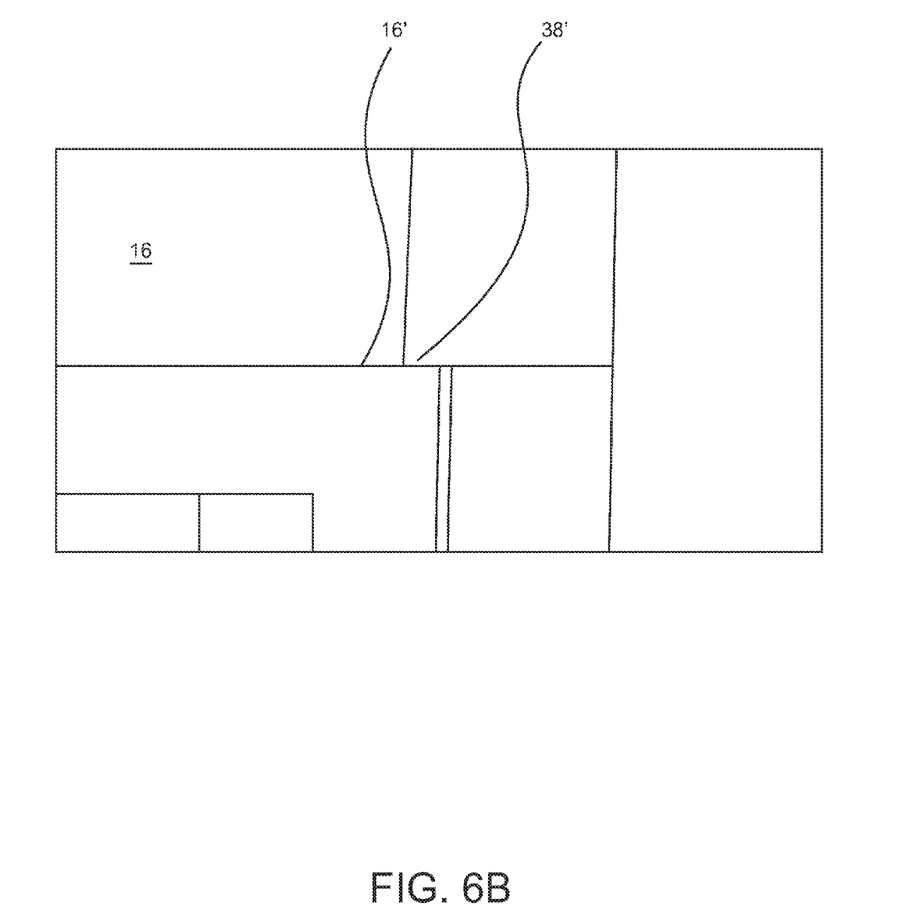
FIG. 6b is a cross-sectional view of the mated male and female members taken from FIG. 6.
Figure 7:
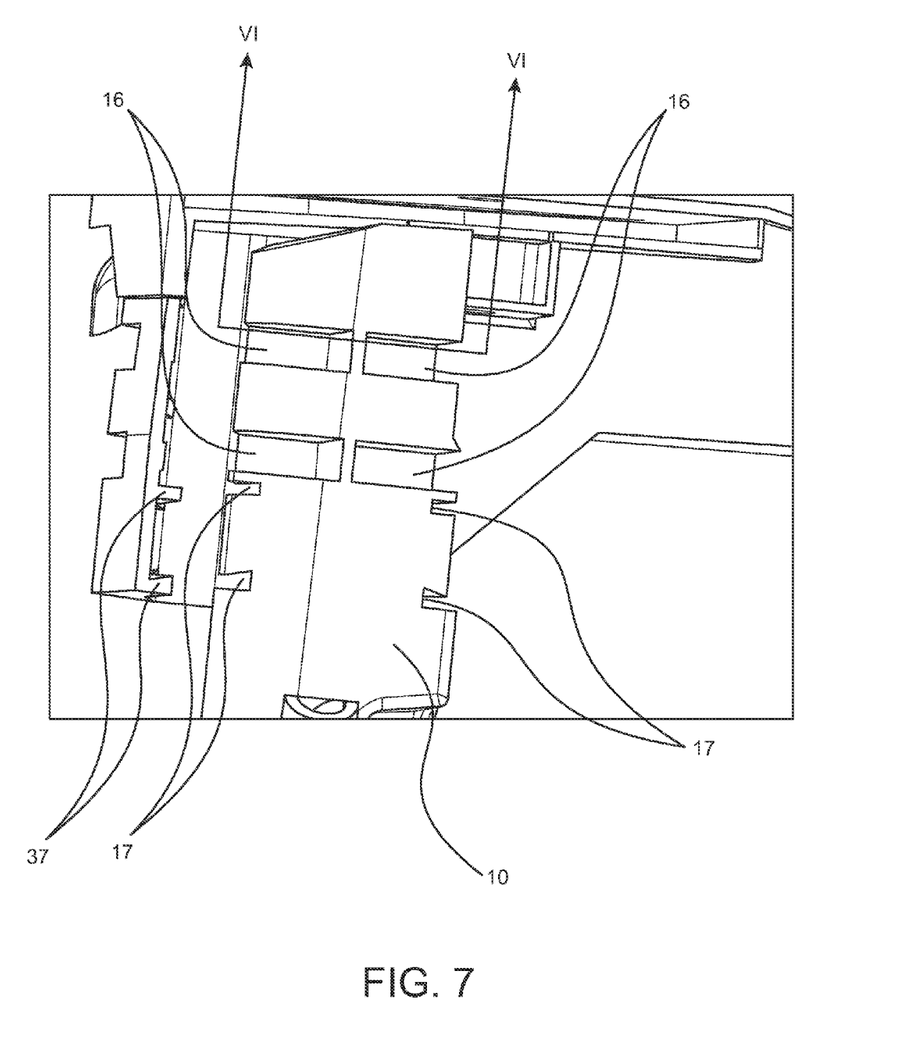
FIG. 7 is a perspective view of disassembled frame elements of the framework of FIG. 1, depicting the cooperating ribs and slots.

While the sidewall 14 is substantially vertically disposed, sidewall 15 is angled inwardly toward insertion end 12. This angled surface terminates about a third of the distance up towards the recesses 16 formed in sidewall 15. Referring to FIGS. 6 through 6b, the width of the male member 11 in the area immediately beneath the bottom surface 16' of each recess 16 is greater than the distance between opposed ramped surfaces 38 defined on the walls 33, 34 of the female member 11.

The angled surface of sidewall 15 and the surface of sidewall 14 immediately below recesses 16 formed in each sidewall 14, 15 define co-acting surfaces which, as described below, contact corresponding co-acting surfaces of the female member's walls 33, 34 to effect temporary outward flexing of the female member. The outward flexing of the female member facilitates locking engagement between the male 11 and female 13 members.

The male member 11 and the frame element 10 are monolithic structures. For example, each may be formed using a process such as, by injection molding, or the like. It is contemplated, however, that the male member 11 may be separately formed and thereafter connected to a frame element. Similarly, it is contemplated that the male member 11 may be positioned at any one or more locations on a frame element. For example, such as at 10, even though in this example the male members 11 are shown as being disposed at the terminal ends of a linear frame element 10.

The male member 11 can assume various shapes, other than shown in this example.

As shown in FIGS. 1 through 6b, the plastic female member 31 includes a socket 32 generally corresponding in shape to the shape of the male member 11. The socket 32 is substantially defined by opposite, upstanding walls 33, 34. The socket 32, also includes an end wall 35 and a bottom 35. The portion of the socket 32 opposite the end wall 35 is open to receive the frame element. The front rail 10 in this example, extends beyond the male member 11. The wall 33 is capable of being temporarily flexed outwardly away from the socket 32 during insertion of the male member lit, as described below in greater detail. While the wall 34 is not likewise designed to be temporarily flexed outwardly, it is contemplated that either or both walls 33, 34 temporarily flex in an outwardly direction in order to permit full seating of the male member 11 in the manner hereafter described.

As shown in FIGS. 1 through 6b, the inner surface facing the socket 32, of walls 33, 34 are somewhat irregularly-shaped. These walls may include a plurality of ribs 37 and ramped surfaces 38 projecting into the socket 32, which engage or contact opposing surfaces of the male member 11 in the manner described further below. Proximate the bottom wall 35, ramped surfaces 38 terminate abruptly to define tabs 38'.

The ramped surfaces 38 of the sidewalls 33, 34 define co-acting surfaces which, upon insertion end 12 of the male member 11 into the socket 32, initially and temporarily contact the previously described co-acting surfaces of the male member's sidewalls 15, 16. As shows in FIGS. 6 through 6b, the configuration of these co-acting surfaces on the male member is such that the width of the male member 11 proximate the bottom walls 16' of the recesses 16 is greater than the corresponding width of the socket 32 between the ramped surfaces 38 defined on the opposing walls 34, 35. Therefore, that until the co-acting surfaces of the male member 11 are positioned below the tabs 38' defined at the end of the ramped surfaces 38, in the fully seated position of the male member 11 into the socket 32 of the female member 31, continued insertion of the male member 11 into the socket 32 will, by continued contact of the co-acting surfaces, cause the wall 33 to be temporarily flexed outwardly and away from the socket 32.

The female member 31 and the frame element 30 may also be monolithic. For example, each may be formed by injection molding or the like. In an example, the female member 31 may be separately formed and thereafter disposed in or on a frame element. In another example, the female member 31 can be positioned at any one or more locations on a frame element of any desired overall configuration. In this example, the female members 31 are located intermediate the terminal ends of a linear frame element 30 of three-walled construction.

In operation, the male member 11 is urged down into the socket 32, the insertion end. 12 first. The co-acting surfaces of the sidewalk 14, 15 of the male member 11 and the co-acting surfaces, such as the ramped surfaces 38 of the walls 33, 34 of the female member 31, act against each other to flex the wall 34 outwardly and away from the socket 32. The wall 34 flexes outwardly until the tabs 38' at the end of the ramped surfaces 38 clear the sidewalls 14, 15 and are brought into opposition with the recesses 16. At this point, the male member 11 is fully seated in the socket of the female member and the wall 33 of the female member is able to return to its default or initial unflexed shape as tabs 38' move into the recesses R by the natural bias of the wall 24.

In the fully seated position of the male member, shown in FIGS. 6 through 6a, the male member 11 is trapped in the socket 32 of the female member by the tabs 38'. In this position, the male member 11 extends into the recesses 16 and thus over the upper edge of the bottom wall 16' of each of these recesses 16.

Referring now to FIGS. 2 through 5, and 7, mating insertion of the male member 11 into the female member 31 further brings the ribs 37 projecting inwardly from the walls 33, 34 into sliding engagement with the slots 17 of the sidewalls 14, 15. Upon complete insertion of the male member 11 into the female member 31, engagement of the ribs 37 in the slots 17 serves to further frictionally engage the male members 11 and female members 21. Such frictional engagement also prevents axial withdrawal of the male member 11 from the female member 31 in the direction Z, as shown in FIG. 1.

Figure 1:
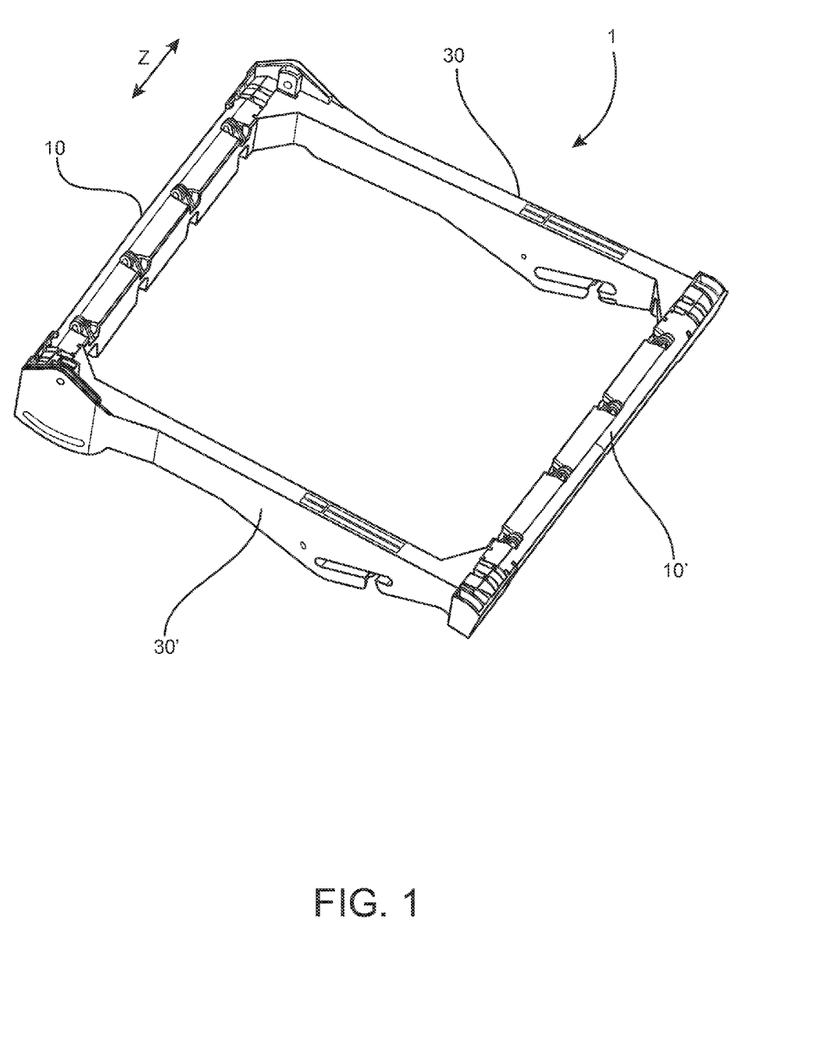
FIG. 1 is a perspective view of a plastic framework including a snap-fit joint, according to an exemplary embodiment.
Figure 2:
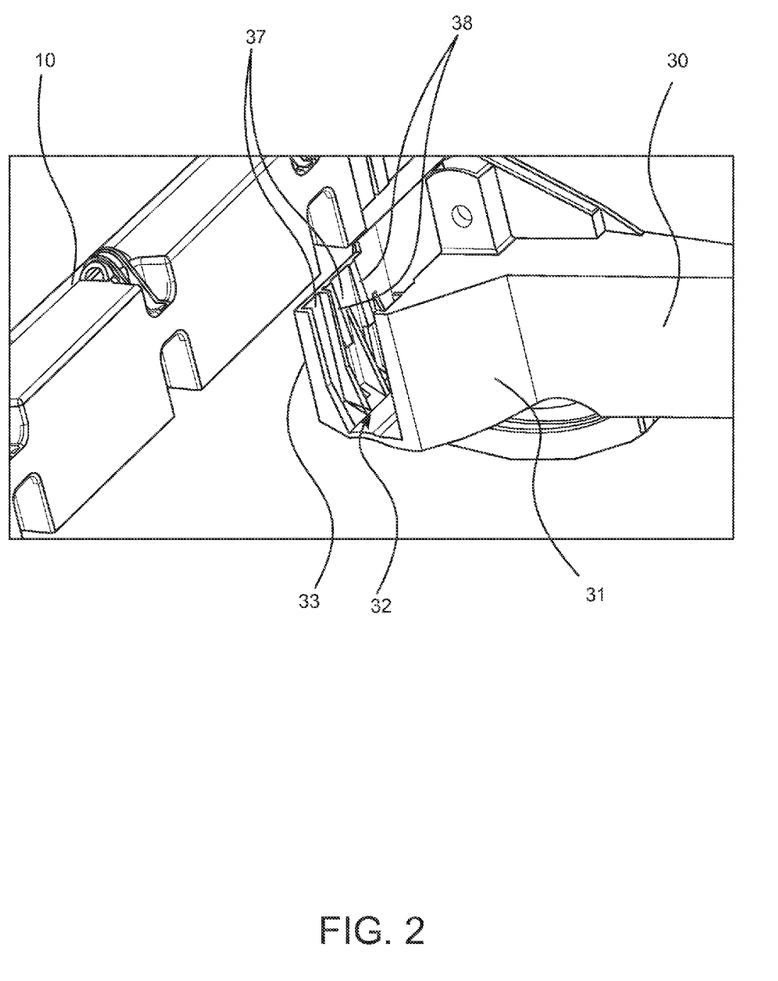
FIG. 2 is a perspective view of disassembled frame elements for the framework of FIG. 1, depicting the socket of the plastic female member.
Figure 8:
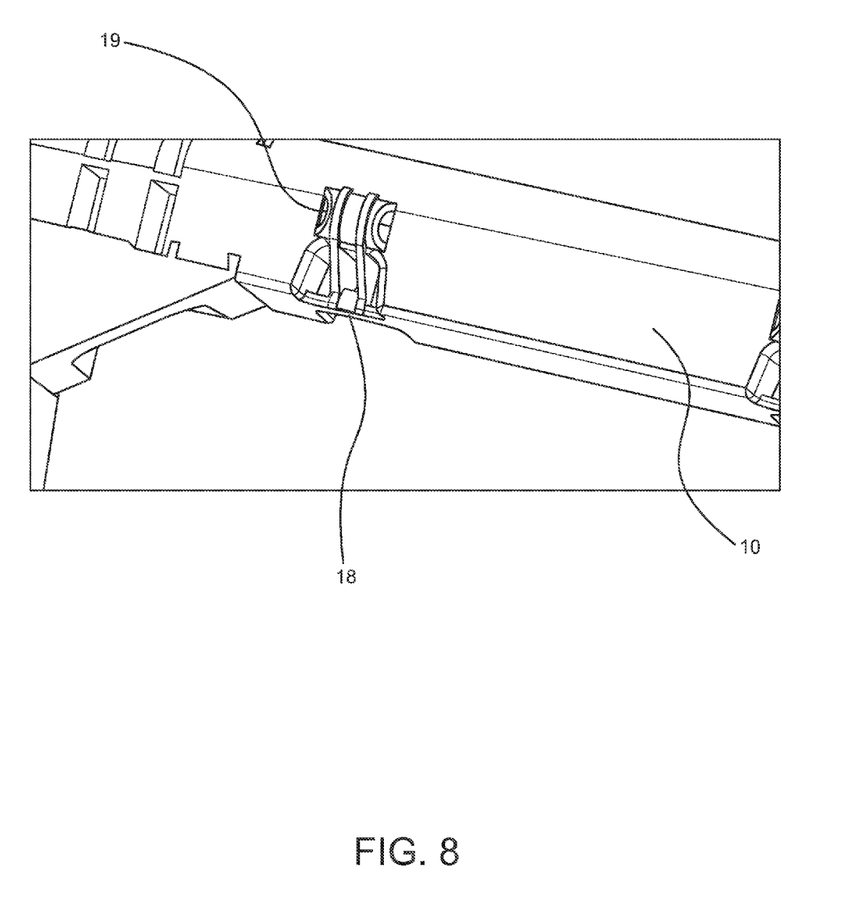
FIG. 8 is a detailed view of a plastic frame element for the framework of FIG. 1 depicting one first and second spring attachment points.
Figure 9:
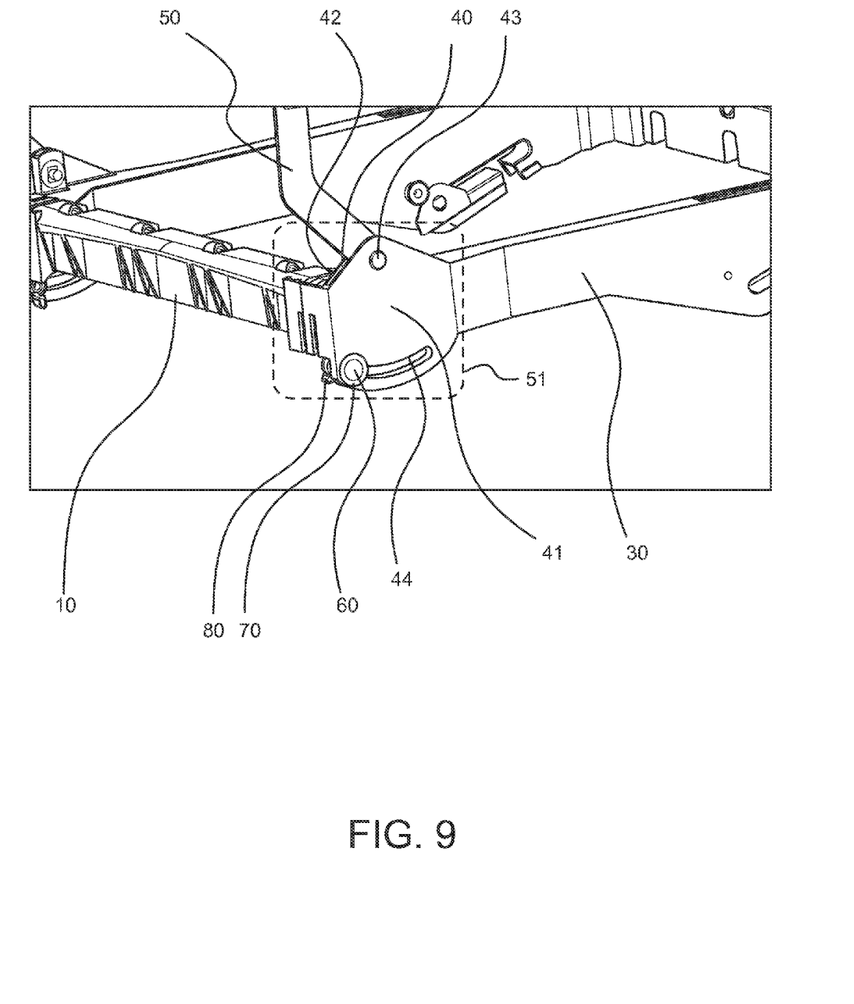
FIG. 9 is a perspective view of the plastic framework of FIG. 1 further showing the pivotal attachment location.

Referring now to FIGS. 1 and 8, an example of the snap-fit joint in a part of a chair framework 1 is illustrated. The chair includes a front rail 10 and a rear 10' rail and a pair of side-rails 30, 30'. Each of the front and rear rails 10, 10' include a plurality of first and second spring attachment points 18, 19 adapted to receive seat springs for the seat base of a chair. The first spring attachment points 18 may be adapted to permit a first degree of radial movement of the seat springs, while the second spring attachment points 19 may be adapted to permit a second degree of radial movement of the seat springs. In this example, the second degree of radial movement is less than the first degree of radial movement.

The front 10 and rear 10' rails may be substantially identical in shape. Use of the same shape dispenses with the manufacture of distinct, complicated frame elements. As shown in FIGS. 1 through 9, the front and rear rails 10, 10' are identical. Accordingly, and in conjunction with the presence of the first and second spring attachment points 18, 19 along the identical rails 10, 10', these rails 10, 10' can be used to form either the front or rear of the framework 1. The rails 10, 10' may also provide securement points for the appropriate spring attachments for the seat spring, padding and covering assembly of the chair. In this example, the rear rail 10' and the first spring attachment points 18, use a horizontal loop area to pass engagement spring feature through, and are used to give the spring some radial movement. In example of a front rail, 10, the second spring attachment points 19 provide the springs a lesser degree of radial movement that is limited to the flat edge of the top of the part.

Referring now to FIGS. 1, 2, 6 and 9, the side-rails 30, 30', which are mirrored-images of each other, also include an adjustment mechanism 51 for pivotally receiving and frictionally adjusting the position of a seat back support arm 50 portion of a chair. This mechanism, described in relation to the side-rail 30 of this example, includes a slot 40 defined between opposing plastic sidewalls 41, 21 of the side-rail 30. A terminal portion (not shown) of the seat back support arm 50 is received in the slot 40 and is further moveable therein as the seat back support arm 50 is pivoted about the pivot point 43. Proximate the bottom of the sidewalls 41, 42 there is further defined a cut-out portion 44, such as in the form of a curved path. A bolt 60 is located within the cut-out portion 44. The bolt 60 may be secured with fasteners, such as washers 70 and a wing-nut 80, or the like to the sidewall. A spring (not shown) is positioned, such as between the wing-nut 80 and an adjacent washer, or between the bolt head and an adjacent washer, to maintain pressure against the washer when the wing-nut is tightened. Thus, the bolt/wing-nut/washer/spring assembly can be selectively positioned along the cut-out 44 and selectively tightened. Such tightening adjusts the degree of compression between the sidewalls 41, 42 and thus, the degree of friction created between the seat back support arm 50 and the sidewalls 41, 42.

In view of the foregoing disclosure, it will be understood that configurations of the male and female members of the snap-fit joint can be readily adapted, to many different uses. Advantageously, a temporary flexing or deformation of the male or female member achieves the interconnection herein described. As a result, the male and female members can be configured to effect flexing of the wall of the male member at locations other than the neck portion.

Many modifications and variations of the present disclosure are possible in light of the above teachings. Therefore, within the scope of the appended claim, the present disclosure may be practiced other than as specifically described.

What is claimed is:

1. A snap-fit joint for connecting a first plastic frame member and a second plastic frame member, the snap-fit joint comprising:
   a plastic male member having an insertion end, a top portion vertically spaced apart from the insertion end, and opposite sidewalls each including a co-acting surface extending between the insertion end and a recess defined by at least one sidewall of the male member, at least one of the co-acting surfaces of the sidewalls tapers inwardly from the recess to define a narrower width of the male member between the co-acting surfaces of the sidewalls at the insertion end; and
   a plastic female member defining a socket with an open end to receive the insertion end of the male member therein, the socket comprising a bottom end wall vertically spaced apart from the open end and opposite facing upstanding walls defining co-acting ramped surfaces that taper into the socket from the open end and terminate to define tabs projecting into the socket from the upstanding walls, at least one upstanding wall configured to flex outwardly away from the socket to a flexed state during receipt of the insertion end of the male member;
   wherein the co-acting surfaces of the sidewalls of the male portion and the co-acting ramped surfaces of the female portion contact each other during insertion of the male portion into the socket of the female member, and the male member defines a width between the co-acting surfaces of the sidewalls at the bottom surface of each recess that is greater than a distance between the opposed co-acting ramped surfaces of the upstanding walls of the female portion, causing the at least one upstanding wall to flex outwardly away from the socket until the male member is fully seated in the socket.

2. The snap-fit joint of claim 1, wherein when the male member is fully seated in the socket, the co-acting surfaces are out of contact with each other, the at least one upstanding wall of the socket returns to an unflexed state, and the tabs of the upstanding walls of the socket are received in the recesses defined by the at least one sidewall of the male member to lock the male member with the socket.

3. The snap-fit joint of claim 1, wherein each upstanding wall of the socket cooperates with one of the sidewalls of the male member through a rib-slot interface comprising:
   a rib extending along one of the upstanding wall of the socket and the sidewall of the male member; and
   a slot defined along the other of the upstanding wall of the socket and the sidewall of the male member.

4. A plastic framework forming part of a chair, the plastic framework comprising:
   a front rail, a rear rail, and a pair of side-rails, each of the front rail, the rear rail, and the pair of side-rails comprising:
      a male member having an insertion end, a top portion vertically spaced apart from the insertion end, and opposite sidewalls; and
      a female member defining a socket with an open end to receive the insertion end of the male member therein, the socket comprising opposite facing upstanding walls, at least one upstanding wall configured to flex outwardly away from the socket to a flexed state during receipt of the insertion end of the male member,
   wherein the front rail and the rear rail of the plastic framework are securely mated to the side-rails of the plastic framework;

wherein the front rail and the rear rail each include a plurality of first and second spring attachment points, the first spring attachment point permitting a first degree of radial movement, and the second spring attachment point permitting a second degree of radial movement, the second degree of radial movement being less than the first degree of radial movement.

5. The plastic framework of claim 4, wherein the upstanding walls of the socket and the opposite sidewalls of the male member each include co-acting surfaces that contact each other during insertion of the male member into the socket of the female member, causing the at least one upstanding wall to flex outwardly away from the socket until the male member is fully seated in the socket, and the co-acting surfaces of the upstanding walls of the socket terminate in tabs and the co-acting surfaces of the sidewalls of the male member each terminate in a recess defined by the male member.

6. The plastic framework of claim 5, wherein when the male member is fully seated in the socket, the co-acting surfaces are out of contact with each other, the upstanding wall of the socket returns to an unflexed state, and the tabs of the upstanding walls of the socket are received in the recesses defined by in the sidewalls of the male member to lock the male member with the socket.

7. The plastic framework of claim 4, wherein each upstanding wall of the socket cooperates with one of the sidewalls of the male member through a rib-slot interface comprising:
   rib extending along one of the upstanding wall of the socket and the sidewall of the male member; and
   a slot defined along the other of the upstanding wall of the socket and the sidewall of the male member.

8. The plastic framework of claim 4, wherein the side-rail includes an adjustment mechanism for pivotally receiving a support arm, and frictionally adjusting a position of the support arm.

9. A plastic framework forming part of a chair, the plastic framework comprising:
   a front, a rear rail, and a pair of side-rails, each of the front rail, the rear rail, and the pair of side-rails comprising:
      a male member having an insertion end, a top portion vertically spaced apart from the insertion end, and opposite sidewalls; and
      a female member defining a socket having an open end to receive the insertion end of the male member therein, wherein the socket includes opposite facing upstanding walls, at least one upstanding wall configured to flex outwardly away from the socket to a flexed state,
      wherein the upstanding walls of the socket and the opposite sidewalls of the male member include co-acting surfaces that contact each other during insertion of the male member into the socket of the female member, causing the at least one upstanding wall to flex outwardly away from the socket until the male member is fully seated in the socket, and the co-acting surfaces of the upstanding walls of the socket terminating in a tab and the co-acting surfaces of the sidewalls of the male member terminating in a recess defined by at least one side wall of the male member, and when the male member is fully seated in the socket, the co-acting surfaces are out of contact with each other, the at least one upstanding wall of the socket returns to an unflexed state, and the tabs of the upstanding walls of the socket are received in the recess defined by the at least one sidewall of the male member to lock the male member with the socket,
   wherein the front rail and the rear rail each include a plurality of first and second spring attachment points, the first spring attachment point permitting a first degree of radial movement, and the second spring attachment point permitting a second degree of radial movement, the second degree of radial movement being less than the first degree of radial movement.

\* \* \* \* \*